US011832181B2

(12) United States Patent
Won et al.

(10) Patent No.: US 11,832,181 B2
(45) Date of Patent: Nov. 28, 2023

(54) APPARATUS OF OPTIMIZING POWER CONSUMPTION AT WAKE-UP SIGNAL RECEIVER IN WIRELESS LAN SYSTEM

(71) Applicant: NEWRACOM, Inc., Lake Forest, CA (US)

(72) Inventors: Junyoun Won, Irvine, CA (US); Joonsoo Lee, Seoul (KR); Hyun Sik Jung, Seoul (KR); Hyungu Park, Irvine, CA (US)

(73) Assignee: NEWRACOM, Inc., Irvine, CA (US)

( * ) Notice: Subject to any disclaimer, the term of this patent is extended or adjusted under 35 U.S.C. 154(b) by 10 days.

(21) Appl. No.: 17/804,068

(22) Filed: May 25, 2022

(65) Prior Publication Data
US 2022/0386237 A1 Dec. 1, 2022

Related U.S. Application Data

(60) Provisional application No. 63/192,985, filed on May 25, 2021.

(51) Int. Cl.
*H04W 52/02* (2009.01)
(52) U.S. Cl.
CPC ... *H04W 52/0229* (2013.01); *H04W 52/0241* (2013.01)
(58) Field of Classification Search
None
See application file for complete search history.

(56) References Cited

U.S. PATENT DOCUMENTS

2015/0009879 A1* 1/2015 Kim ............... H04W 74/002 370/311
2021/0195524 A1* 6/2021 Ahn ............... H04W 52/0229

OTHER PUBLICATIONS

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.
IEEE P802.11ax/D8.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, Oct. 2020, 820 pages.
IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

(Continued)

*Primary Examiner* — Hong Shao
(74) *Attorney, Agent, or Firm* — Nicholson, De Vos, Webster & Elliott, LLP

(57) ABSTRACT

A method performed by a wireless device operating in a wireless network. The method includes receiving a wake-up receiver frame, wherein the wake-up receiver frame includes a continuous frame field that indicates whether a further wake-up receiver frame comes after the wake-up receiver frame and determining whether the further wake-up receiver frame exists based on a content of the continuous frame field.

20 Claims, 18 Drawing Sheets

(56) References Cited

OTHER PUBLICATIONS

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, Dec. 7, 2016, 594 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.

IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

IEEE Std 802.11p-2010 Part 11: Wireless LAN Medium Access Control (MAC) and Physical Layer (PHY) Specifications, Amendment6: Wireless Access in Vehicular Environments, IEEE Standard for Information technology—Telecommunications and information exchange between systems, Local and metropolitan area networks—Specific requirements, Jul. 15, 2010, 51 pages.

\* cited by examiner

| | |
|---|---|
| Frequency Band | License-exempt bands below 1 GHz, excluding the TV white spaces |
| Channel Width | 1/2/4/8/16 MHz |
| Modulation Schemes | BPSK, QPSK, 16-QAM, 64-QAM, 256-QAM |
| Maximum Number of Spatial Streams | Four spatial streams |
| Range | Up to 1Km (outdoor) |
| End Node Transmit Power | Dependent on regional regulations (from 1 mW to 1 W) |
| Packet Size | Up to 7,991 bytes (without aggregation) up to 65,535 bytes (with aggregation) |
| Data Rate | 150 kb/s (1 MHz channel bandwidth, 1 spatial stream, BPSK, 1/2 coding rate, repetition coding) to 347 Mb/s (16 MHz channel bandwidth, 4 spatial streams, 256 QAM, 5/6 coding rate) |
| Number of Stations | Up to 6000 |
| Location | Indoor and outdoor |
| Traffic Type | Periodic packet transmission every few to tens minutes |

FIG. 6

Generate a wake-up receiver data wake-up frame, wherein the wake-up receiver data wake-up frame includes a frame body field that includes data intended for a recipient of the wake-up receiver data wake-up frame
1805

Wirelessly transmit the wake-up receiver data wake-up frame
1810

FIG. 18

Receive a wake-up receiver data wake-up frame, wherein the wake-up receiver data wake-up frame includes a frame body field that includes data intended for the wireless device
1905

Transition to an awake state and process the data in response to receiving the wake-up receiver data wake-up frame
1910

FIG. 19

APPARATUS OF OPTIMIZING POWER CONSUMPTION AT WAKE-UP SIGNAL RECEIVER IN WIRELESS LAN SYSTEM

CROSS-REFERENCE TO RELATED APPLICATION

This application claims the benefit of U.S. Provisional Application No. 63/192,985, filed May 25, 2021, titled, "APPARATUS OF OPTIMIZING POWER CONSUMPTION AT WAKE-UP SIGNAL RECEIVER IN WIRELESS LAN SYSTEM," which is hereby incorporated by reference.

TECHNICAL FIELD

The present disclosure generally relates to wireless communications, and more specifically, relates to reducing power consumption in a wireless network.

BACKGROUND

Institute of Electrical and Electronics Engineers (IEEE) 802.11 is a set of physical and Media Access Control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

The IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table listing various characteristics of 802.11ah, according to some embodiments.

FIG. 18 is a diagram showing a method for generating and transmitting a wake-up receiver data wake-up frame, according to some embodiments.

FIG. 19 is a diagram showing a method for receiving and processing a wake-up receiver data wake-up frame, according to some embodiments.

DETAILED DESCRIPTION

Figure 1:
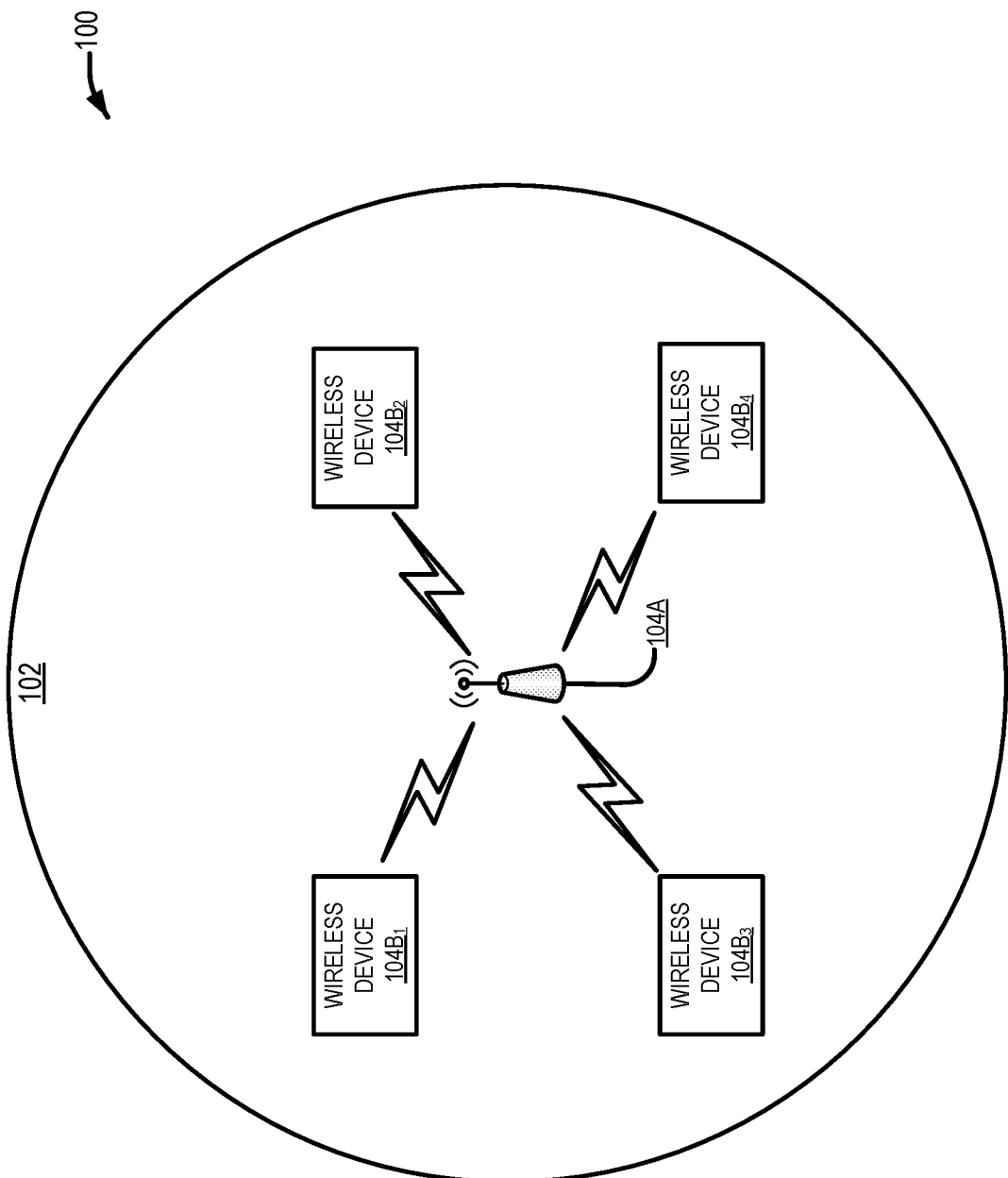
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to reducing power consumption in a wireless network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B$_1$-104B$_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B$_1$-104B$_4$) may be collectively referred to as STAs. However, for ease of description, only the non-AP STAs may be referred to as STAs. Although shown with four non-AP STAs (e.g., the wireless devices 104B$_1$-104B$_4$), the WLAN 100 may include any number of non-AP STAs (e.g., one or more wireless devices 104B).

Figure 2:
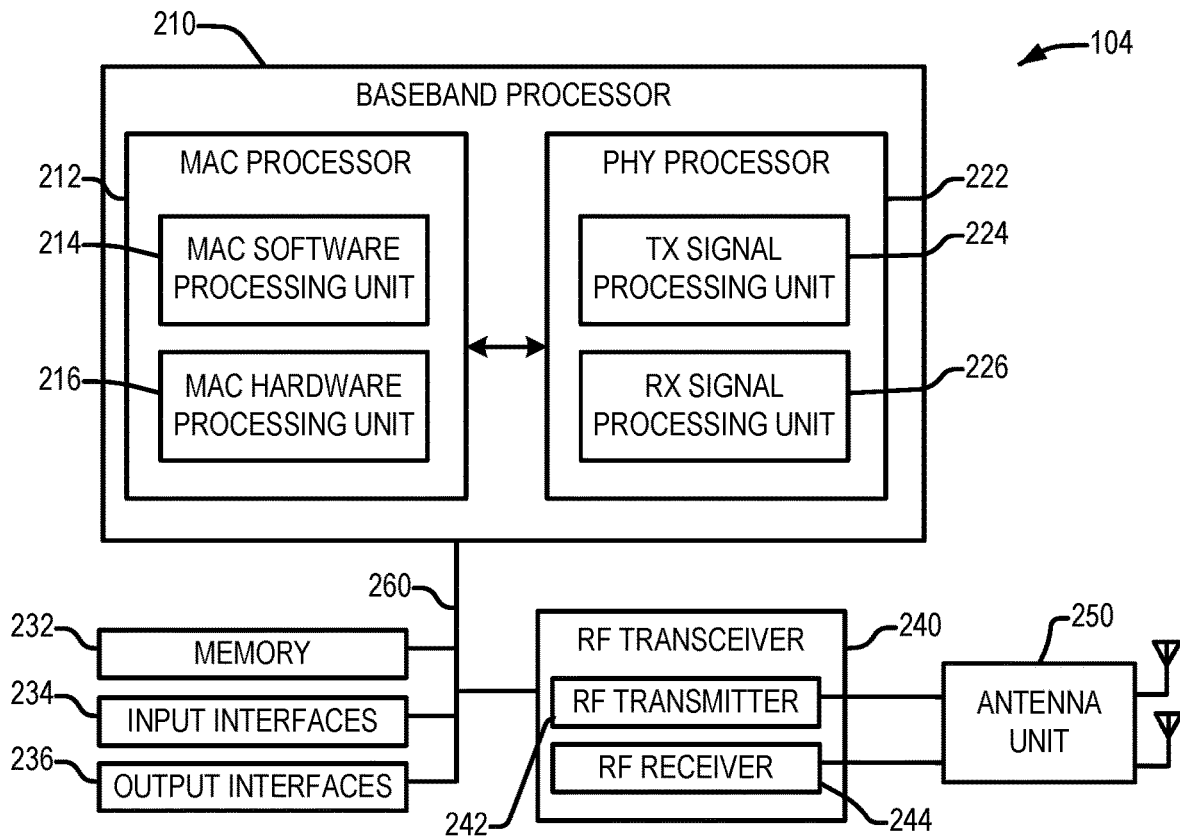
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B$_1$-104B$_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
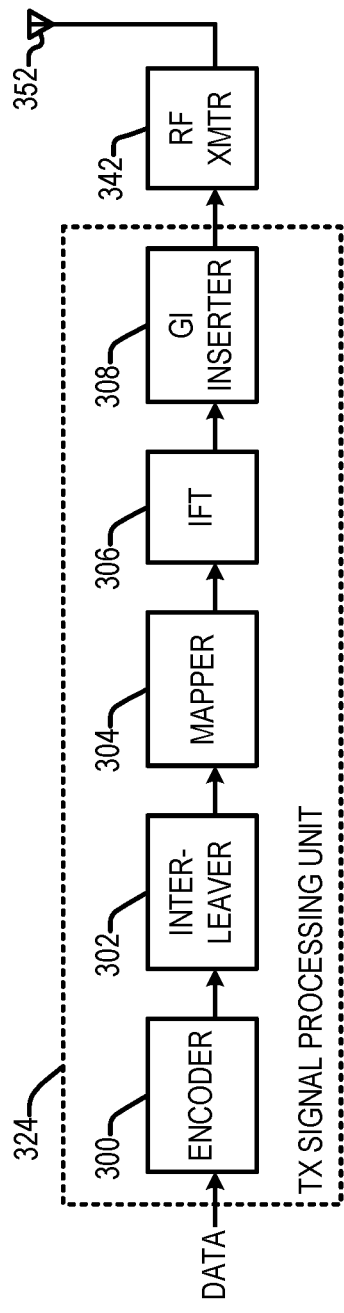
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
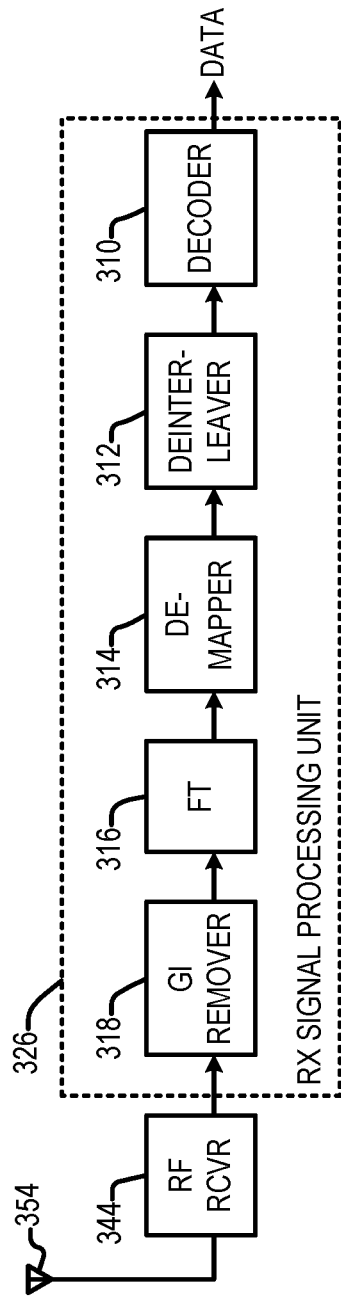
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MC S) and a maximum number of spatial streams.

Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
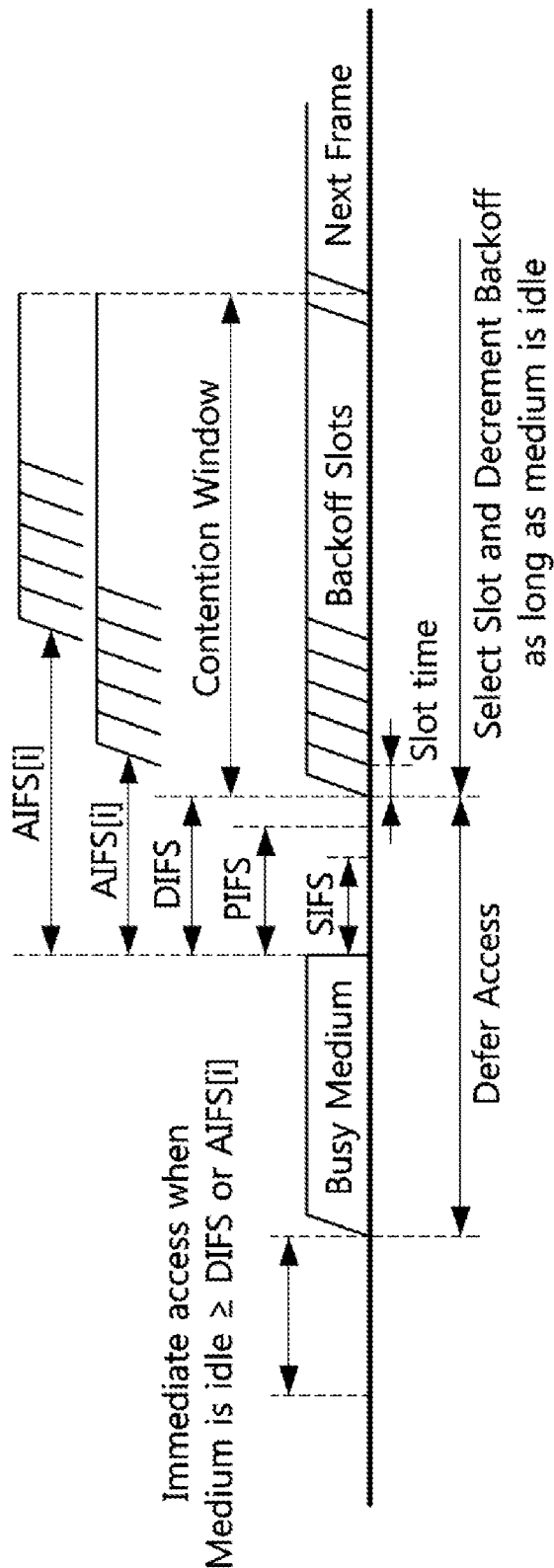
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time.

When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
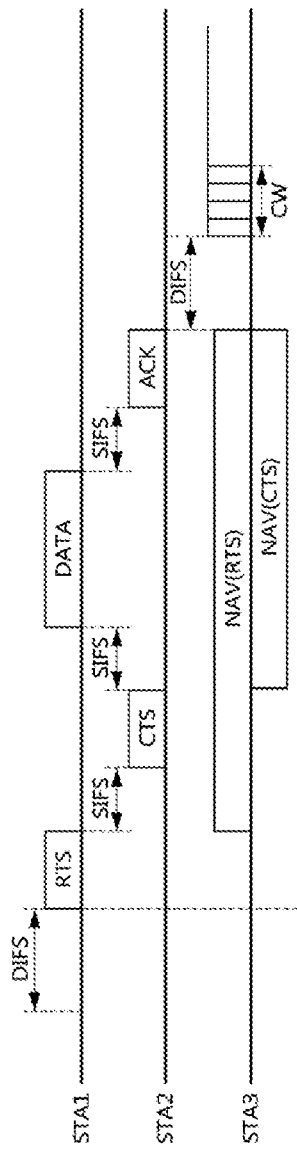
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

As mentioned above, the IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

Although S1G bands have more limited frequency spectrum available than 2.4 and 5 GHz ISM bands, the basic assumption is it would be sufficient enough for low data rate applications such as IoT applications. IoT applications typically transmit small amounts of data infrequently. Moreover, since the 915 MHz ISM band (902-928 MHz) has 8.5 dB less free space propagation loss than 2.4 GHz ISM band, this could allow to enhance either the link budget between devices or long-range transmission for outdoor circumstances. Those properties can help reduce energy consumption of a device by lowering transmit power as well.

FIG. 6 shows a table listing various characteristics of 802.11ah, according to some embodiments. Even though the IEEE 802.11ah standard provides power saving features for IoT networks, some application areas such as sensor networks require ultra-low power operation to further extend network lifetime (operation time). In order to support ultra-low power operation, an addition transmission scheme, which consumes with very low power, can be employed in addition to the standard IEEE 802.11ah transmission scheme. One such transmission scheme is an on-off keying (OOK) scheme with narrow bandwidth. An OOK signal can be demodulated with non-coherent detection with simple timing synchronization. Instead of using a complicated channel coding approach, a repetition (or spreading) scheme can be used to obtain the same communication range as the lowest modulation and coding scheme (MCS) of IEEE 802.11ah. The concept of a low-power wake-up receiver has been discussed in the standardization efforts of IEEE 802.11. In this concept, the communications subsystems include a main radio (e.g., IEEE 802.11ah) and a low-power wake-up receiver (also referred to simply as a "wake-up receiver" or "WUR"). The wake-up receiver may operate in the sub-1 GHz band (instead of the 2.4 GHz and 5 GHz bands).

When a non-AP STA supporting a low power mode does not transmit/receive data to/from an AP STA, it may transition to a doze state in order to reduce power consumption. The non-AP STA may check whether there is data to be received from the AP STA by waking up (transitioning to an awake state) every listen interval of a beacon or in an TWT (Target Wake-up Time) service interval. If there is no data to be transmitted/received, the non-AP STA may transition to the doze state again to reduce power consumption. In certain WLAN applications, the power consumption has to be extremely small due to physical limitations so the interval between transitioning to the doze state to the awake state becomes relatively long. In this case, data to be transmitted by the AP STA to the non-AP STA may not be immediately transmitted, and the non-AP STA may transition to the doze state if it does not receive any data for a certain period of time. Thus, the data that the AP STA attempts to transmit to the non-AP STA is not transmitted until the next awake state of the non-AP STA, so as to be delayed. In order to resolve this issue, a wake-up receiver technique has been proposed where the non-AP STA can receive a wake-up signal from the AP STA using very little power and where the non-AP STA receiving the wake-up signal transitions to the awake state immediately so as to be able to receive data transmitted by the AP STA without delay.

When an AP STA wakes up the non-AP STA using a wake-up signal in which only small functions are activated, the power consumption of the non-AP STA can be reduced. In addition, if the non-AP STA decides the time for receiving the wake-up signal at a predetermined interval with the AP STA, and attempts to receive the wake-up signal at that time, the power consumption of the non-AP STA can be further reduced.

A method is disclosed herein for minimizing power consumption and allowing the AP STA to safely wake up the non-AP STA by dynamically adjusting a wake-up time margin when the non-AP STA fails to receive a wake-up signal and then again when the non-AP STA receives a wake-up signal. Further, a method is disclosed herein for resynchronizing the timer with an AP STA and performing the wake-up signal again when the non-AP STA fails to synchronize with the AP STA. Further, a method is disclosed herein for composing information fields that can be used to carry out the above-mentioned methods and information fields that can help reduce the power consumption in the non-AP STA.

According to some embodiments, when a non-AP STA does not receive an expected time synchronization frame (e.g., a wake-up receiver beacon frame) from an AP STA (e.g., due to noise or interference), a wake-up time margin is increased at the next service period to allow the non-AP STA to receive the time synchronization frame or other type of wake-up signal. In an embodiment, if the non-AP STA receives a time synchronization frame as expected, the wake-up time margin is reverted to its original value and the whole service period is also reverted, thereby reducing the extended power consumption after reception failure. Further, in an embodiment, a timer is re-synchronized to meet the duty cycle when the wake-up signal is not received because the time synchronization is out of sync. Further, a in an embodiment, wake-up frames of various types are aggregated and/or data intended for a recipient is included in a wake-up frame to help minimize channel occupancy and power consumption.

When there is no data to be exchanged between an AP STA and a non-AP STA in a WLAN system, the non-AP STA may transition to a doze state (a power save mode) to reduce power consumption. The non-AP STA may wake up according to a beacon listen interval to periodically check whether there is data to be received from the AP STA. In certain applications, there is a case where there is little data to be exchanged between the AP STA and the non-AP STA. In this case, most of the power consumed by the non-AP STA is used for waking up at the beacon listen interval and receiving the beacon. In such applications, the entire system can be activated when the non-AP STA receives a wake-up radio signal in a low power mode using only minimal power. If the non-AP STA transmits and receives data to/from the AP STA immediately afterwards, it can immediately update an information from the AP STA while reducing its power consumption. The AP STA may wake up a non-AP STA which uses very little power and senupdated information, if the non-AP STA can receive only the wake-up (radio) signal in a doze state. A state in which only the wake-up signal can be received in the doze state is defined as a wake-up receiver awake state, and a device sleep state in which even the wake-up signal cannot be received is defined as a wake-up receiver doze state. After association, the AP STA and the non-AP STA may exchange information about whether to use the wake-up signal with each other through a management frame, and set a wake-up radio mode. A time period in which the non-AP STA can receive the wake-up signal from the AP STA may be referred to as a duty cycle service period. The duty cycle service period may repeat according to a predetermined duty cycle. If an AP STA has data to transmit to a non-AP STA, the AP STA may generate and transmit a wake-up signal to the non-AP STA in the duty cycle service period. Upon receiving the wake-up signal, the non-AP STA may transition to an awake state (in which the main radio is active) and transmit/receive data to/from the AP STA as WLAN signals. When a non-AP STA attempts to receive the wake-up signal at the duty cycle interval, the clock offsets with the AP STA may be accumulated and the duty cycle service period may gradually shift. To correct this offset, the AP STA may send timestamp information to the non-AP STA at regular intervals, and the corresponding frame transmitted as the wake-up signal may be called a wake-up receiver beacon frame. When the non-AP STA receives the wake-up receiver beacon frame in the wake-up receiver awake state, a local timer of the non-AP STA is synchronized with the timer of the AP STA using the timestamp information included in the wake-up receiver beacon frame. When a non-AP STA does not receive the wake-up receiver beacon frames transmitted by the AP STA at the regular intervals, time synchronization with the AP STA may fail, resulting in even more timing errors. In order to compensate for this offset, embodiments increase a duty cycle service period time of the wake-up receiver awake state by adding a wake-up time margin before and after the duty cycle service period so that the next wake-up receiver beacon frame with timing offset can be better received. If the non-AP STA does not receive a wake-up receiver beacon frame continuously, more wake-up time margins can be added to the duty cycle service period. If a wake-up receiver beacon frame is successfully received, any wake-up time margins that were previously added are removed to revert the awake time of the wake-up receiver to the initial duty cycle service period. If the non-AP STA fails to receive a wake-up receiver beacon frame consecutively for a predetermined threshold number of times, it may be regarded as a case in which frames cannot be transmitted and received with the wake-up signal due to an exceptionally large time error or other environmental factors, and the non-AP STA may transition to the awake state so that it can perform transmission/reception with the AP STA using a general WLAN frame (instead of a wake-up receiver frame).

Figure 7:
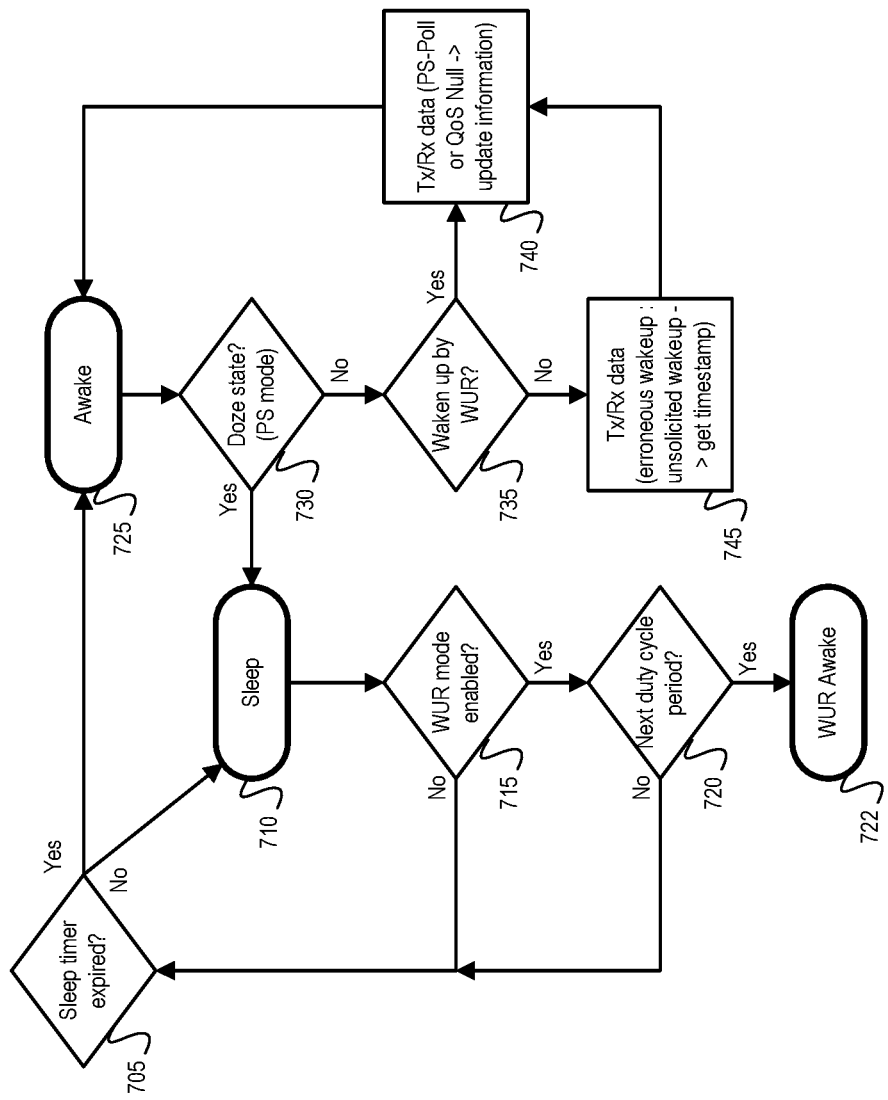
FIG. 7 is a flow diagram showing wake-up receiver operations, according to some embodiments.

FIG. 7 is a flow diagram showing wake-up receiver operations, according to some embodiments. The operations may be performed by a wireless device (e.g., a non-AP STA).

As shown in the diagram, at operation 705, the wireless device determines whether the sleep timer has expired. If not, the flow moves to operation 710 in which the wireless device is in a sleep state (a state in which the main radio is turned off to reduce power consumption—the sleep state may be divided into a wake-up receiver doze state (in which the wake-up receiver is off) and a wake-up receiver awake state (in which the wake-up receiver is on)). At operation 715, the wireless device determines whether wake-up receiver (WUR) mode is enabled (WUR mode is a mode in which the wireless device makes use of its wake-up receiver to reduce power consumption—WUR mode may be configured using the main radio). If not, the flow moves to operation 705. Otherwise, if wake-up receiver mode is enabled, then at operation 720, the wireless device determines whether the next duty cycle service period has arrived (this service period may arrive in periodic intervals). If not, then the flow moves to operation 705. Otherwise, if the next duty cycle period has arrived, then at operation 722, the wireless device transitions to a wake-up receiver awake state.

Returning to operation 705, if the sleep timer has expired, at operation 725, the wireless device transitions to an awake state (main radio is on). At operation 730, the wireless device determines whether it should be in a doze state (power save mode). If so, at operation 710, the wireless device transitions to a sleep state. Otherwise, at operation 735, the wireless device determines whether it was woken up by the wake-up receiver. If not, at operation 745, the wireless device transmits/receives data (erroneous wakeup: unsolicited wakeup->get timestamp (e.g., it is possible that the wireless device regards the erroneous frame as wake-up frame designated to itself so after it is woken up, it may send a frame while setting the unsolicited flag—the AP STA may determine whether the wireless device was erroneously woken up or not.)). Otherwise, at operation 740, the wireless device transmits/receives data (PS-Poll or QoS Null->update information (e.g., if the wireless device sends PS-Poll or QoS Null, then AP STA may know that the wireless device is not in doze state)). The flow then moves to operation 725 in which the wireless device is in an awake state.

Figure 8:
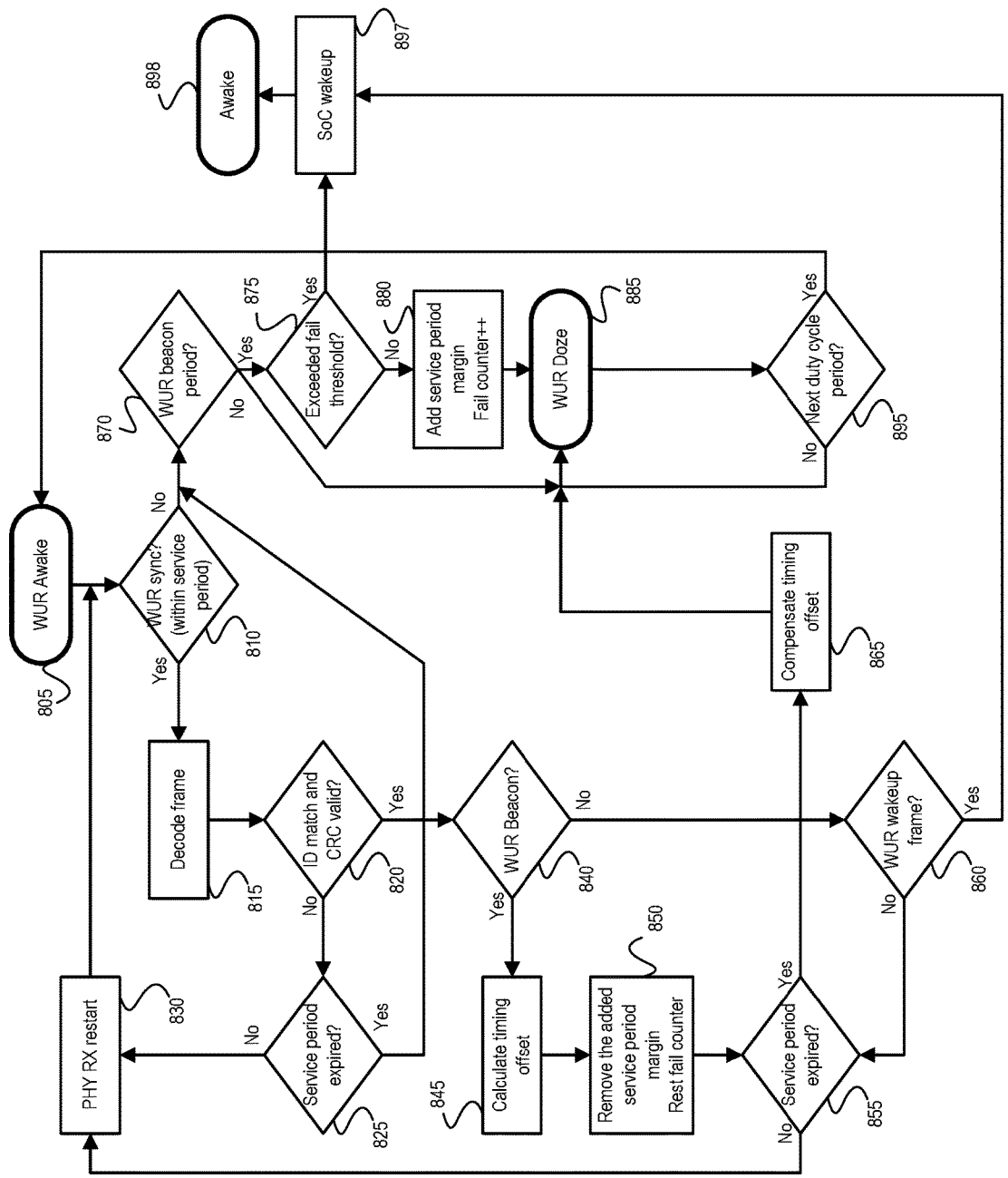
FIG. 8 is a flow diagram showing wake-up receiver operations with dynamic adjustment of wake-up time margins, according to some embodiments.

FIG. 8 is a flow diagram showing wake-up receiver operations with dynamic adjustment of wake-up time margins, according to some embodiments. The operations may be performed by a wireless device (e.g., a non-AP STA).

As shown in the diagram, at operation 805, the wireless device is in a wake-up receiver awake state. At operation 810, the wireless device determines whether it has received a wake-up receiver sync (within a duty cycle service period). If so, at operation 815, the wireless device decodes the frame. At operation 820, the wireless device determines whether the ID included in the frame matches and the cyclic redundancy check (CRC) included in the frame is valid (e.g., ID matches with one of WUR ID, WUR group ID, and transmitter ID, and also CRC is valid). If not, at operation 825, the wireless device determines whether the duty cycle service period has expired. If not, at operation 830, the wireless device performs a PHY RX restart (e.g., to try to receive another a wake-up receiver sync if the duty cycle service period has not expired) and the flow moves to operation 810. Otherwise, the flow moves to operation 870.

Returning to operation 820, if the ID matches and CRC is valid, then at operation 840, the wireless device determines whether the frame is a wake-up receiver beacon frame. If so, at operation 845, the wireless device calculates the timing offset and at operation 850, the wireless device removes any added wake-up time margin and resets the fail counter. At operation 855, the wireless device determines whether the service period has expired. If not, the flow moves to operation 830. Otherwise, at operation 865, the wireless device compensates the timing offset and the flow moves to operation 885 in which the wireless device is in a wake-up receiver doze state.

Returning to operation 840, if the frame is not a wake-up receiver beacon frame, at operation 860, the wireless device determines whether the frame is a wake-up receiver wake-up frame. If not, the flow moves to operation 855. Otherwise, at operation 897, the wireless device performs a SoC wakeup and the flow moves to operation 898 in which the wireless device is in an awake state (main radio is turned on).

Returning to operation 810, if a wake-up receiver sync has not been received, at operation 870, the wireless device determines whether a wake-up receiver beacon period has arrived. If not, the flow moves to operation 885 in which the wireless device is in a wake-up receiver doze state. Otherwise, at operation 875, the wireless device determines whether the fail threshold has been exceeded (the fail counter exceeds the fail threshold). If so, the flow moves to operation 897. Otherwise, at operation 880, the wireless device adds to the service period margin and increments the fail counter. The flow moves to operation 885, in which the wireless device is in a wake-up receiver doze state. At operation 895, the wireless device determines whether the next duty cycle period has arrived. If not, the flow moves to operation 885, in which the wireless device is in a wake-up receiver doze state. Otherwise, the flow moves to operation 805, in which the wireless device is in a wake-up receiver awake state.

Thus, when time synchronization fails using the wake-up signal, awake time compensation is dynamically performed (by adding the margin) so that the wake-up signal can be better received. If the time synchronization is successful, it is possible to optimize the power of the wake-up receiver awake state by removing the dynamically compensated time (by removing any previously added margins).

As shown in FIG. 8, if the synchronization pattern for a wake-up signal is matched, ID, CRC, and other information may be decoded. At this time, if the ID field does not match the non-AP STA's WUR ID, WUR Group ID or Transmitter ID, the non-AP STA waits to receive another wake-up signal within the duty cycle service period until another synchronization pattern is matched. It may be inefficient for the non-AP STA to consume power to find a matching synchronization pattern throughout the duty cycle service period. In an embodiment, a field (called a continuous frame field) is added to a wake-up receiver frame to indicate whether a further wake-up receiver frame comes after the current wake-up receiver frame transmitted by the AP STA. If it is determined based on the continuous frame field that there are no more wake-up receiver frames to be transmitted by the AP STA and it is determined that reception of the wake-up receiver frame fails in the corresponding service period, then the power consumption can be further reduced by transitioning to the wake-up receiver doze state. Even when the reception of the wake-up receiver frame is successful (if the ID and the CRC are matched), if the continuous frame field is checked and the next wake-up receiver frame is additionally decoded, the wake-up signal can be used efficiently. The AP STA and the non-AP STA may decide whether to transmit/receive the wake-up receiver frame only at the boundary of the duty cycle service period or whether to receive a wake-up receiver frame transmitted across the boundary to the end at the time of wake-up receiver mode setup.

Figure 9:
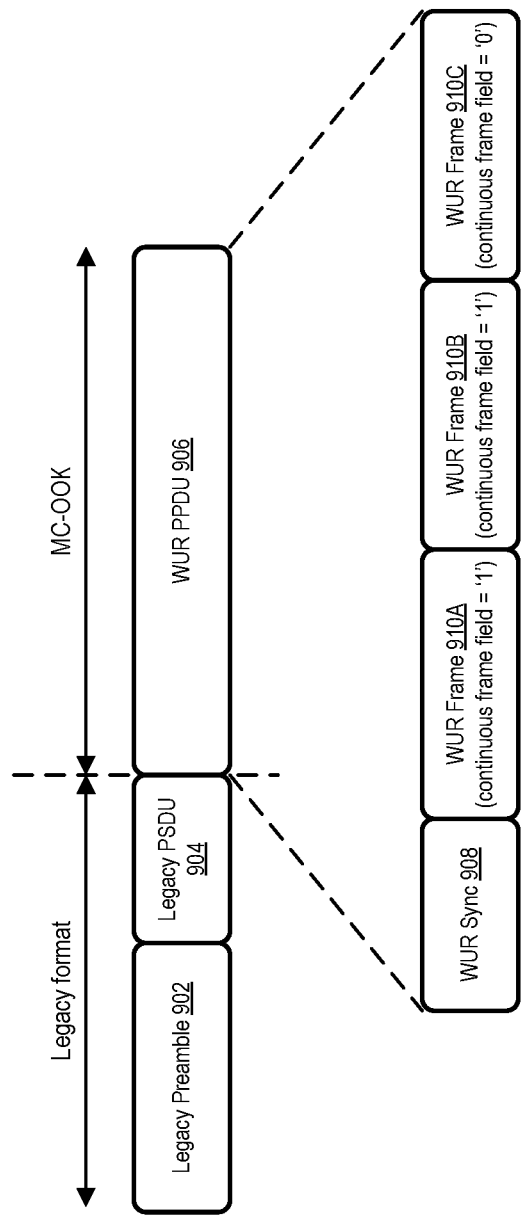
FIG. 9 is a diagram showing a wake-up receiver physical layer protocol data unit (PPDU) and the use of continuous frame field in wake-up receiver frames, according to some embodiments.

FIG. 9 is a diagram showing a wake-up receiver PPDU and the use of continuous frame field in wake-up receiver frames, according to some embodiments. Various features and formats are described herein in the context of 802.11 standards using terminology of 802.11 standards. Certain details (e.g., the details of certain fields/subfields and their purpose) are omitted herein for sake of conciseness and to avoid obscuring the description. As shown in the diagram, a wake-up receiver PPDU 906 includes a wake-up receiver sync 908 (synchronization pattern), wake-up receiver frame 910A, wake-up receiver frame 910B, and wake-up receiver frame 910C. The wake-up receiver PPDU may be transmitted using a multicarrier on-off keying (MC-OOK) method. Also, in order to prevent overhearing legacy STAs from transmitting in the transmission duration of the wake-up receiver PPDU (MC-OOK) signal, the AP STA may add a preamble 902 with a legacy format or a preamble 902 plus PSDU 904 with a legacy format before the wake-up receiver PPDU 906. As shown in the diagram, wake-up receiver frame 910A includes a continuous frame field that is set to '1' to indicate that there exists a further wake-up receiver frame (wake-up receiver frame 910B) that comes after wake-up receiver frame 910A. Similarly, wake-up receiver frame 910B includes a continuous frame field that is set to '1' to indicate that there exists a further wake-up receiver frame (wake-up receiver frame 910C) that comes after wake-up receiver frame 910B. Wake-up receiver frame 910C includes a continuous frame field that is set to '0' to indicate that there are no further wake-up receiver frames that come after wake-up receiver frame 910C. Although a value of binary '1' is used as an example to indicate that there is a further wake-up receiver frame, other embodiments may use a different value/convention.

Figure 10:
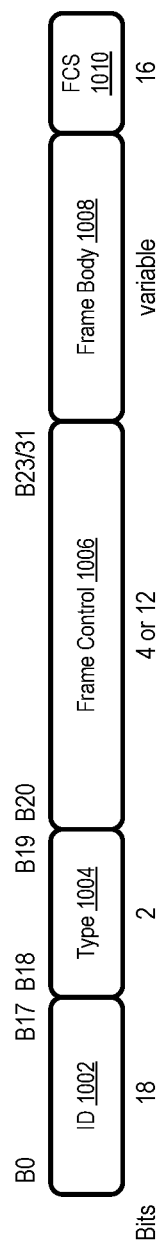
FIG. 10 is a diagram showing a field format for a wake-up receiver frame, according to some embodiments.

FIG. 10 is a diagram showing a field format for a wake-up receiver frame, according to some embodiments. As shown in the diagram, the field format for the wake-up receiver frame includes an ID field 1002, a type field 1004, a frame control field 1006, a frame body field 1008, and a frame check sequence (FCS) field 1010. Notably, the field format is structured such that the ID field 1002 is the foremost field. This allows a non-AP STA receiving the wake-up receiver frame to check the ID first and transition to a wake-up receiver doze state if the ID does not match the non-AP STA's ID. In this and other diagrams, bit positions are represented as Bn, where n represents the position.

In an embodiment, if the ID field does not match, a non-AP STA checks a value of a continuous data field and immediately transitions to a wake-up receiver doze state if the continuous data field is set to zero (or otherwise indicates that no further wake-up frames come after the current wake-up frame) to reduce power consumption.

In an embodiment, if the ID matches, after checking a type field (e.g., which indicates whether the frame is a beacon frame or wake-up frame) and an FCS field, the non-AP STA decides to wait for a next wake-up receiver sync (if there is room in the duty cycle service period) or to transition to the wake-up receiver doze state (if there is no room in the duty cycle service period). The continuous frame field may be included in a frame control field. The non-AP STA checks the continuous frame field, and immediately transitions to the wake-up receiver doze state if there are no additional wake-up receiver frames to be received. In an embodiment, if there is an additional wake-up receiver frame to be received, the non-AP STA checks an FCS of the currently received frame, and decodes the additional wake-up receiver frame only if the received frame has no error. In an embodiment, if an error occurs when receiving a preceding wake-up receiver frame, any subsequent wake-up receiver frames are regarded as also having errors and cannot be received. Thus, the non-AP STA may transition to a wake-up receiver doze state. Power consumption can be reduced by quickly transitioning to the wake-up receiver doze state.

Figure 11:
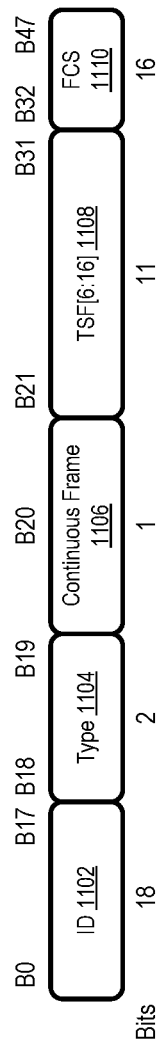
FIG. 11 is a diagram showing a field format for a wake-up receiver beacon frame that includes timestamp information, according to some embodiments.

FIG. 11 is a diagram showing a field format for a wake-up receiver beacon frame that includes timestamp information, according to some embodiments. As shown in the diagram, the field format for the wake-up receiver beacon frame includes an ID field 1102, a type field 1104, a continuous frame field 1106, a TSF[6:16] field 1108, and a FCS field 1110.

In an embodiment, if an ID and an FCS match, a non-AP STA synchronizes time with the AP STA using a TSF field 1108. At this time, if the AP STA sets a continuous frame field and transmits a further wake-up receiver frame after the FCS field 1110, more information can be transmitted within a duty cycle service period through wake-up receiver frames. This allows for transmitting another wake-up receiver frame without having to resend a PPDU with a legacy format and a wake-up receiver sync field, which results in using channel resources more efficiently.

Figure 12:
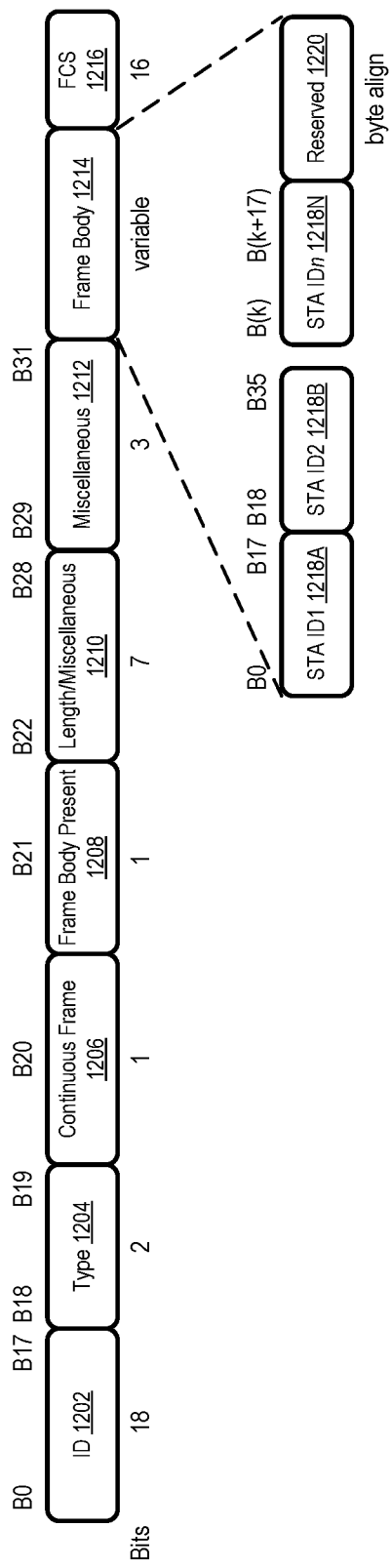
FIG. 12 is a diagram showing a field format for a wake-up receiver wake-up frame that includes information regarding STAs to be woken up, according to some embodiments.

FIG. 12 is a diagram showing a field format for a wake-up receiver wake-up frame that includes information regarding STAs to be woken up, according to some embodiments. As shown in the diagram, the field format for the wake-up receiver wake-up frame includes an ID field 1202, a type field 1204, a continuous frame field 1206, a frame body present field 1208, a length/miscellaneous field 1210, a miscellaneous field 1212, a frame body field 1214, and a FCS field 1216. As shown in the diagram, the frame body field 1214 includes multiple STA ID fields 1218A-N and a reserved field 1220.

In an embodiment, when the ID field 18 includes a broadcast ID or a multicast ID, only STAs having IDs that match the IDs indicated in the ID fields 1218 of the frame body wake up. In an embodiment, if there is no frame body, all non-AP STAs are woken up when the broadcast ID is used, and all non-AP STAs belonging to a group are woken up when the multicast ID is used. A length field may indicate the length of a frame body in units of bytes. If the STA ID is not byte-aligned, any values can be entered as reserved bits to achieve byte alignment. In an embodiment, if there is a continuous frame field (indicating that a further wake-up receiver frame comes after the current one) and the FCS matches, a subsequent wake-up receiver frame after the FCS is decoded. Using the wake-up frame structure shown in FIG. 12, multiple STAs may be woken up through one wake-up receiver frame, resulting in less power consumption and/or less channel occupation.

Figure 13:
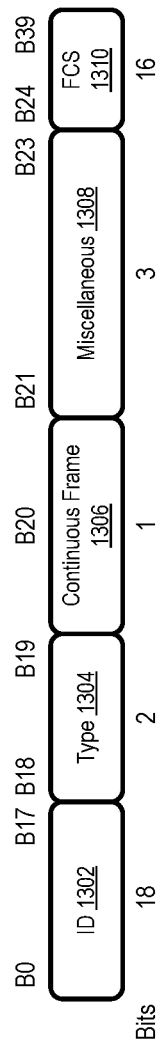
FIG. 13 is a diagram showing field format for a short wake-up receiver wake-up frame with reduced information, according to some embodiments.

FIG. 13 is a diagram showing field format for a short wake-up receiver wake-up frame with reduced information, according to some embodiments. The short wake-up receiver wake-up frame with reduced information may be used to occupy a channel for a short time when waking up only one non-AP STA. As shown in the diagram, the field format for the short wake-up receiver wake-up frame includes an ID field 1302, a type field 1304, a continuous frame field 1306, a miscellaneous field 1308, and a FCS field 1310. Since the short wake-up receiver wake-up frame includes a continuous frame field 1306, it can be transmitted together with other subsequent wake-up receiver frames.

Figure 14:
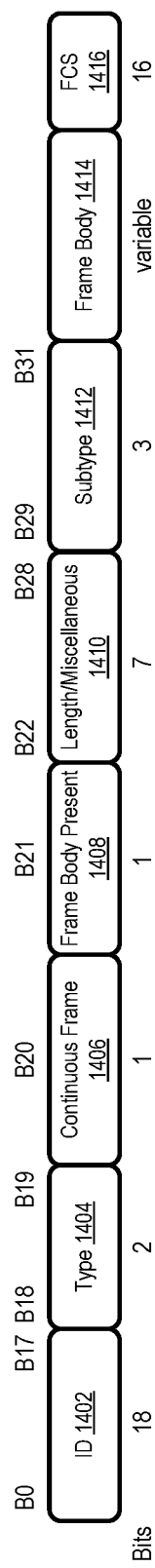
FIG. 14 is a diagram showing a field format for a wake-up receiver data wake-up frame, according to some embodiments.

FIG. 14 is a diagram showing a field format for a wake-up receiver data wake-up frame, according to some embodiments. The wake-up receiver data wake-up frame may be used when an AP STA wishes to wake a non-AP STA up and also transmit specific data to the non-AP STA at the same time. As shown in the diagram, the field format for the wake-up receiver data wake-up frame includes an ID field 1402, a type field 1404, a continuous frame field 1406, a frame body present field 1408, a length/miscellaneous field 1410, a subtype field 1412, a frame body field 1414, and a FCS field 1416.

In an embodiment, data that is included in a wake-up receiver data frame may be divided into general data and control information according to a subtype. The general data may be data that the non-AP STA uses after waking up, and the control information may be used to change a wake-up receiver operation of the non-AP STA. For example, it may be used for the AP STA to dynamically increase or decrease a duty cycle to efficiently control power consumption, or to adjust a failure threshold for wake-up receiver beacon reception, or to adjust the time margin added to a duty cycle service period. Although there is a limit on the maximum length of a wake-up receiver PPDU, when the AP STA transmits a small amount of general data or control information to the non-AP STA in the wake-up receiver data frame, it can help to reduce power consumption and allow the non-AP STA to more quickly process the data after waking up only using wake up signals, compared to transmitting a WLAN signal after waking up the entire system of the non-AP STA. By using the wake-up receiver data wakeup frame, an efficient configuration for each non-AP STA can be performed, and small amounts of general data can be transmitted through the wake-up signal, thereby reducing power consumption.

Embodiments disclosed herein help reduce power consumption while maintaining reception performance by dynamically adjusting a wake-up time margin when time synchronization between an AP STA and a non-AP STA is out of sync. Also, embodiments disclosed herein help reduce channel occupancy and reduce power consumption by aggregating and transmitting/receiving multiple consecutive wake-up receiver frames using a continuous frame field. Also, embodiments disclosed herein help reduce power consumption by using a wake-up receiver frame that includes data intended for the recipient STA. By using the wake-up receiver frame that includes data, less power is consumed to process data compared to a case where the non-AP STA has to wake up and receive data using its main radio (WLAN receiver).

Figure 15:
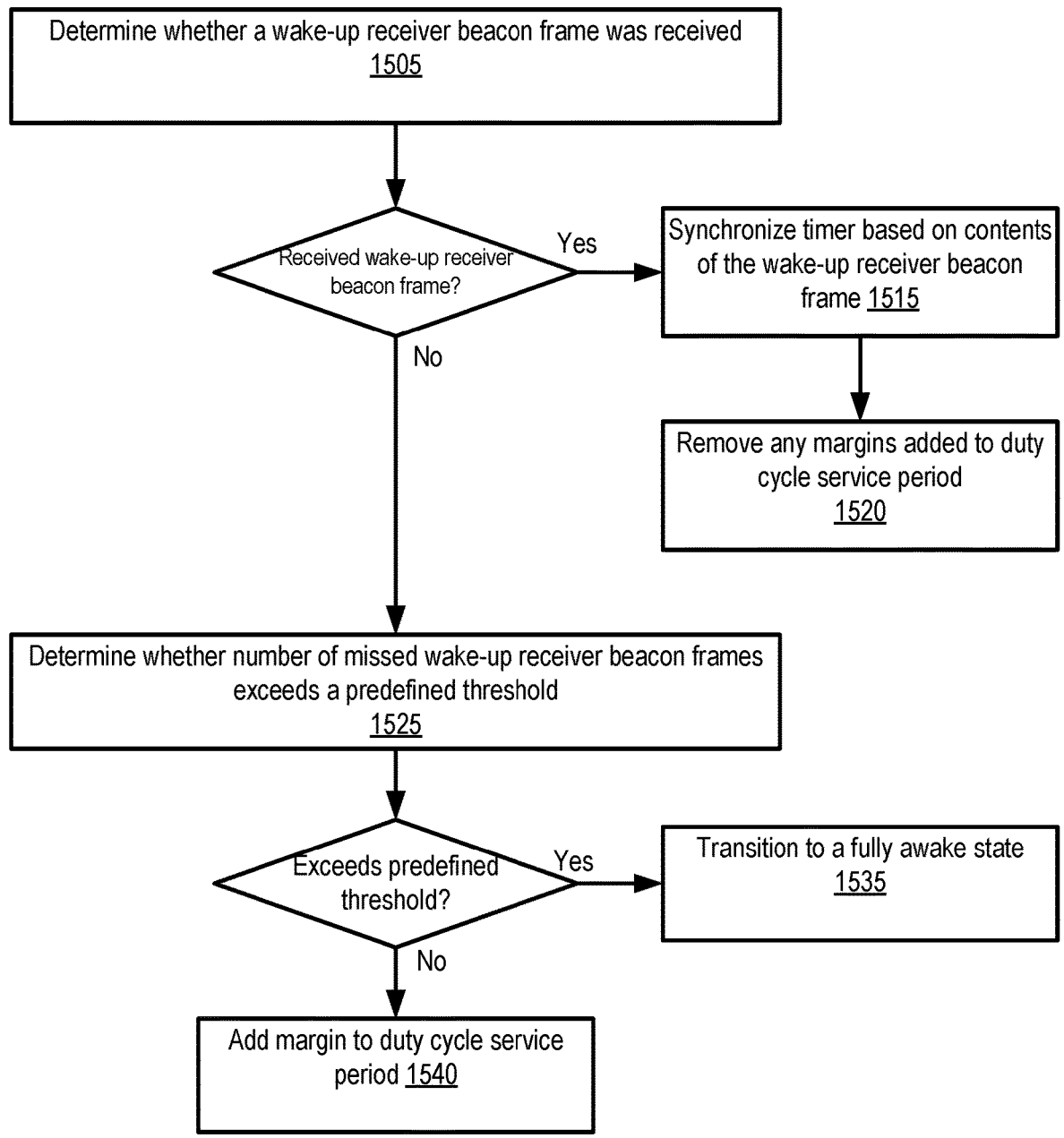
FIG. 15 is a diagram showing a method for adjusting a wake-up time margin, according to some embodiments.

Turning now to FIG. 15, a method 1500 will now be described for adjusting a wake-up time margin, in accordance with some embodiments. The method 1500 may be performed by one or more devices described herein. For example, the method 1500 may be performed by a wireless device 104 functioning as a non-AP STA in a wireless network.

Although shown in a particular order, in some embodiments the operations of the method 1500 (and the other methods shown in the other figures) may be performed in a different order. For example, although the operations of the method 1500 are shown in a sequential order, some of the operations may be performed in partially or entirely overlapping time periods.

As shown in FIG. 15, the method 1500 may commence at operation 1505 with the wireless device determining whether a wake-up receiver beacon frame was received (as expected). If not, then at operation 1525, the wireless device determines whether the number of missed wake-up receiver beacon frames exceeds a predefined threshold. If not, then at operation 1540, the wireless device adds a wake-up time margin to the duty cycle service period (to make the duty cycle service period longer). Otherwise, at operation 1535, the wireless device transitions to a (fully) awake state (the main radio is turned on). Returning to operation 1505, if the wake-up receiver beacon frame was received, then at operation 1515, the wireless device synchronizes its timer based on contents of the wake-up receiver beacon frame and at operation 1520, the wireless device removes any wake-up time margins added to the duty cycle service period. The method 1500 may be repeated for each wake-up receiver beacon frame interval to adjust the wake-up time margin.

Figure 16:
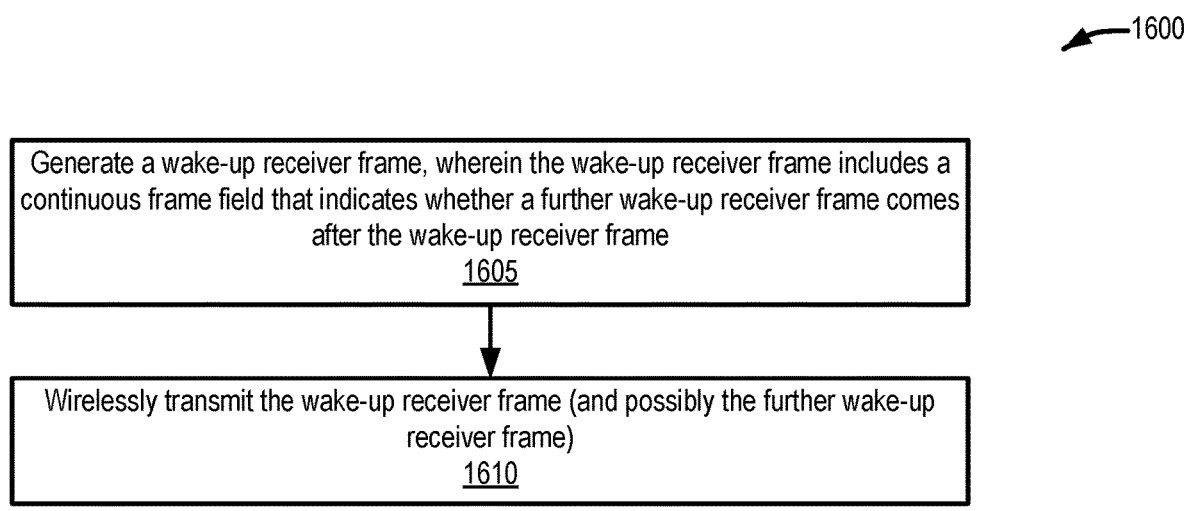
FIG. 16 is a diagram showing a method for generating and transmitting a wake-up receiver frame, according to some embodiments.

Turning now to FIG. 16, a method 1600 will now be described for generating and transmitting a wake-up receiver frame, in accordance with some embodiments. The method 1600 may be performed by one or more devices described herein. For example, the method 1600 may be performed by a wireless device 104 functioning as an AP STA in a wireless network.

As shown in FIG. 16, the method 1600 may commence at operation 1605 with the wireless device generating a wake-up receiver frame, wherein the wake-up receiver frame includes a continuous frame field that indicates whether a further wake-up receiver frame comes after the wake-up receiver frame. At operation 1610, the wireless device wirelessly transmits the wake-up receiver frame (and possibly the further wake-up receiver frame). In an embodiment, multiple wake-up receiver frames are generated and transmitted in succession, where the continuous frame field for each of the wake-up receiver frames except for the last one indicates that a further wake-up receiver frame comes after the current wake-up receiver frame.

Figure 17:
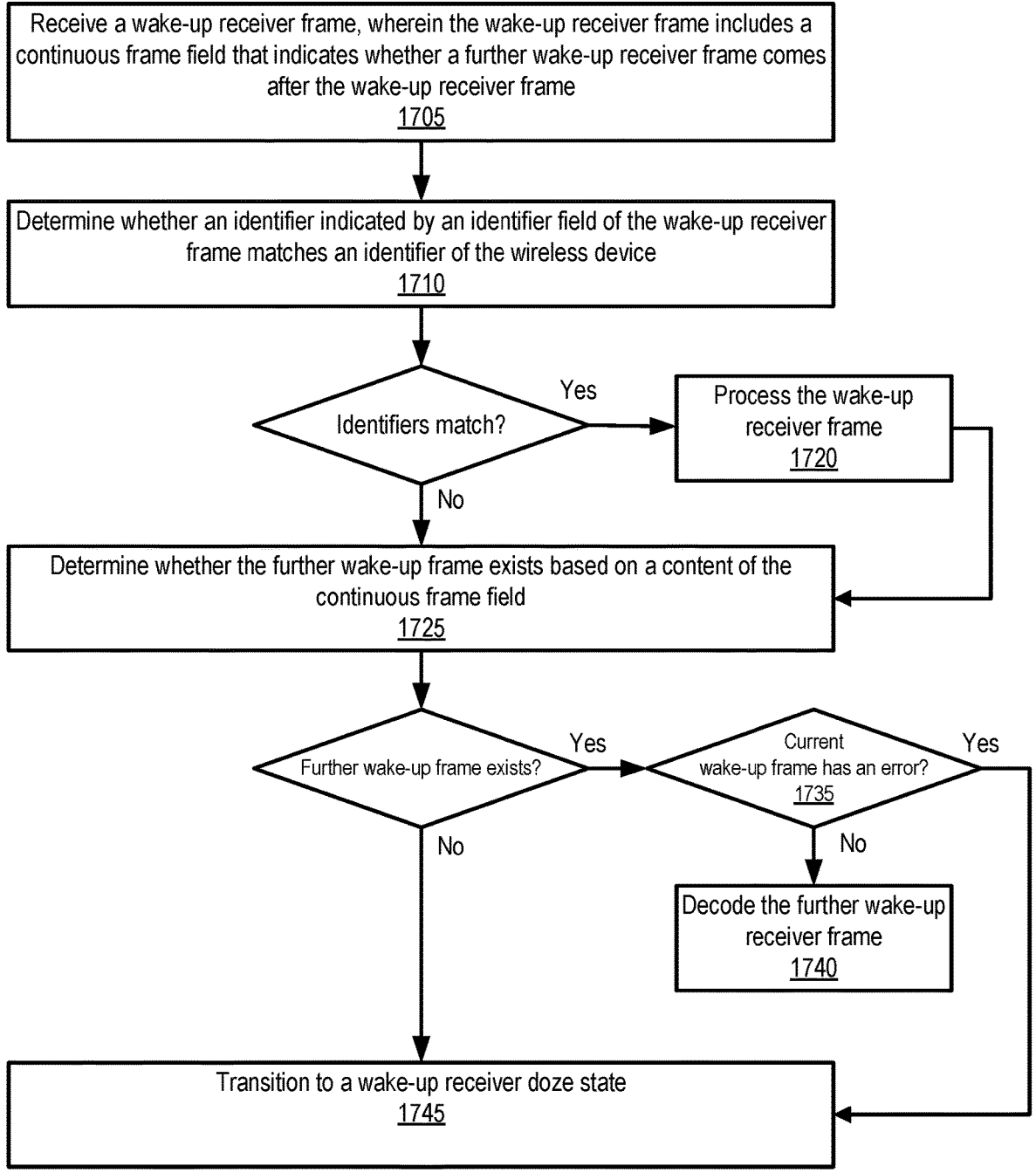
FIG. 17 is a diagram showing a method for receiving and processing a wake-up receiver frame, according to some embodiments.

Turning now to FIG. 17, a method 1700 will now be described for receiving and processing a wake-up receiver frame, in accordance with some embodiments. The method 1700 may be performed by one or more devices described herein. For example, the method 1700 may be performed by a wireless device 104 functioning as a non-AP STA in a wireless network.

As shown in FIG. 17, the method 1700 may commence at operation 1705 with the wireless device receiving a wake-up receiver frame, wherein the wake-up receiver frame includes a continuous frame field that indicates whether a further wake-up receiver frame comes after the wake-up receiver frame. At operation 1710, the wireless device determines whether an identifier indicated by an identifier field of the wake-up receiver frame matches an identifier of the wireless device. If so, then at operation 1720, the wireless device processes the wake-up receiver frame and the flow moves to operation 1725. Otherwise, if the identifiers do not match, then the flow moves directly to operation 1725. At operation 1725, the wireless device determines whether the further wake-up frame exists based on a content of the continuous frame field. If the further wake-up frame does not exist, then at operation 1745, the wireless device transitions to a wake-up receiver doze state. Otherwise, if the further wake-up frame does exist, then at operation 1735, the wireless device determines whether the (current) wake-up frame has an error. If so, the wireless device transitions to a wake-up receiver doze state (operation 1745). Otherwise, at operation 1740, the wireless device decodes the further wake-up receiver frame. The method 1700 may be repeated for the further wake-up receiver frame.

Turning now to FIG. 18, a method 1800 will now be described for generating and transmitting a wake-up receiver data wake-up frame, in accordance with some embodiments. The method 1800 may be performed by one or more devices described herein. For example, the method 1800 may be performed by a wireless device 104 functioning as an AP STA in a wireless network.

As shown in FIG. 18, the method 1800 may commence at operation 1805 with the wireless device generating a wake-up receiver data wake-up frame, wherein the wake-up receiver data wake-up frame includes a frame body field that includes data intended for a recipient of the wake-up receiver data wake-up frame. At operation 1810, the wireless device wirelessly transmits the wake-up receiver data wake-up frame.

Turning now to FIG. 19, a method 1900 will now be described for receiving and processing a wake-up receiver data wake-up frame, in accordance with some embodiments. The method 1900 may be performed by one or more devices described herein. For example, the method 1900 may be performed by a wireless device 104 functioning as a non-AP STA in a wireless network.

As shown in FIG. 19, the method 1900 may commence at operation 1905 with the wireless device receiving a wake-up receiver data wake-up frame, wherein the wake-up receiver data wake-up frame includes a frame body field that includes data intended for a recipient of the wake-up receiver data wake-up frame. At operation 1910, the wireless device transitions to an awake state and processes the data in response to receiving the wake-up receiver data wake-up frame.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a wireless device operating in a wireless network, the method comprising:

receiving a wake-up receiver frame, wherein the wake-up receiver frame includes a continuous frame field that indicates whether a further wake-up receiver frame comes after the wake-up receiver frame within a same wake-up receiver physical layer protocol data unit (PPDU); and determining whether the further wake-up receiver frame exists based on a content of the continuous frame field.

2. The method of claim 1, wherein the continuous frame field is included in a frame control field of the wake-up receiver frame.

3. The method of claim 1, further comprising:
determining whether an identifier indicated by an identifier field of the wake-up receiver frame matches an identifier of the wireless device.

4. The method of claim 3, wherein the identifier field is a foremost field of the wake-up receiver frame.

5. The method of claim 4, wherein the identifier field occupies bits B0 to B17 of the wake-up receiver frame.

6. The method of claim 3, further comprising:
transitioning to a wake-up receiver doze state in response to a determination that the identifier indicated by the identifier field of the wake-up receiver frame does not match the identifier of the wireless device and the further wake-up receiver frame does not exist.

7. The method of claim 3, further comprising:
processing the wake-up receiver frame in response to a determination that the identifier indicated by the identifier field of the wake-up receiver frame matches the identifier of the wireless device.

8. The method of claim 7, further comprising:
transitioning to a wake-up receiver doze state after processing the wake-up receiver frame in response to a determination that the further wake-up receiver frame does not exist.

9. The method of claim 7, further comprising:
determining whether the wake-up receiver frame has an error based on a frame check sequence (FCS) indicated by a FCS field of the wake-up receiver frame.

10. The method of claim 9, further comprising:
transitioning to a wake-up receiver doze state after processing the wake-up receiver frame in response to a determination that the wake-up receiver frame has the error despite a determination that the further wake-up receiver frame exists.

11. The method of claim 9, further comprising:
decoding the further wake-up receiver frame in response to a determination that the wake-up receiver frame does not have an error and a determination that the further wake-up receiver frame exists.

12. The method of claim 1, wherein the wake-up receiver frame is a wake-up receiver beacon frame.

13. The method of claim 1, wherein the wake-up receiver frame is a wake-up receiver wake-up frame.

14. The method of claim 13, wherein the wake-up receiver frame includes a frame body field, wherein the frame body field indicates identifiers of a plurality of wireless devices that are to be woken up.

15. The method of claim 1, wherein the wake-up receiver frame is a wake-up receiver data wake-up frame.

16. The method of claim 1, wherein the wake-up receiver frame includes a subtype field and a frame body field, wherein the frame body field includes data intended for the wireless device and the subtype field indicates a type of the data included in the frame body field.

17. A wireless device that is to operate in a wireless network, the wireless device comprising:

a radio frequency transceiver;
a memory device storing a set of instructions; and
a processor coupled to the memory device, wherein the set of instructions when executed by the processor causes the wireless device to:
   receive a wake-up receiver frame, wherein the wake-up receiver frame includes a continuous frame field that indicates whether a further wake-up receiver frame comes after the wake-up receiver frame within a same wake-up receiver physical layer protocol data unit (PPDU) and
   determine whether the further wake-up receiver frame exists based on a content of the continuous frame field.

18. The wireless device of claim 17, wherein the continuous frame field is included in a frame control field of the wake-up receiver frame.

19. The wireless device of claim 17, wherein the set of instructions when executed by the processor further causes the wireless device to:
   determine whether an identifier indicated by an identifier field of the wake-up receiver frame matches an identifier of the wireless device.

20. The wireless device of claim 19, wherein the identifier field is a foremost field of the wake-up receiver frame.

* * * * *